Nov. 23, 1954 　　　C. H. HILL　　　2,694,962
SLOTTING HEAD FOR POWER TOOLS
Filed April 16, 1951
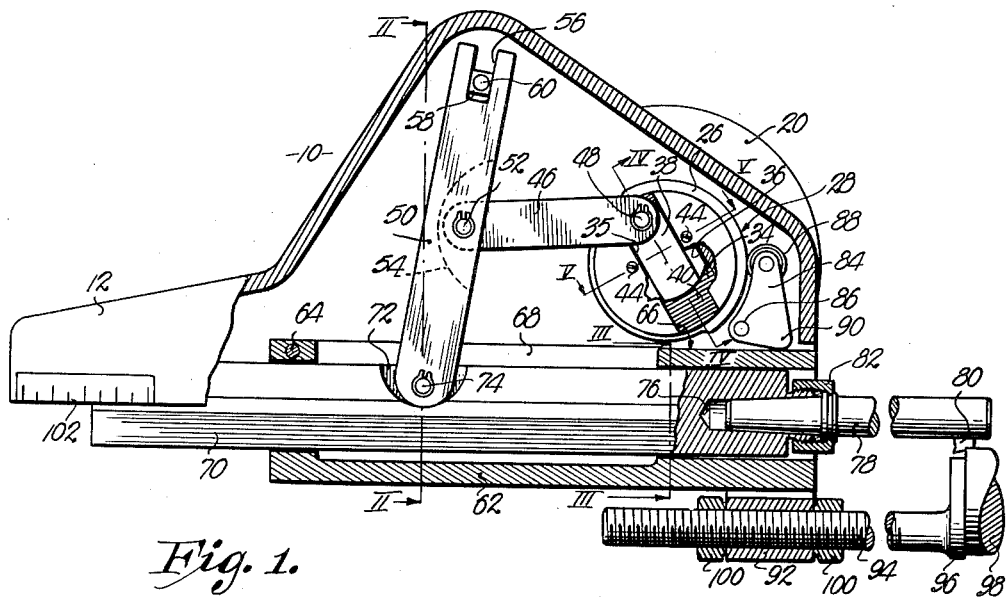
Fig. 1.
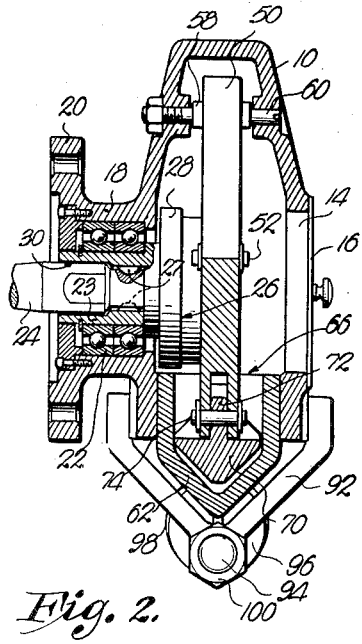
Fig. 2.
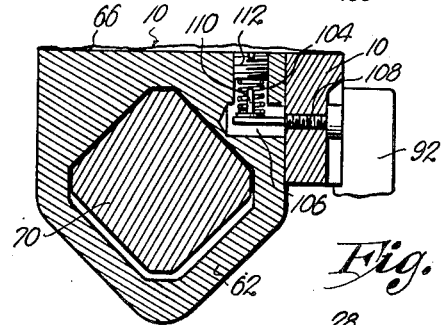
Fig. 3.
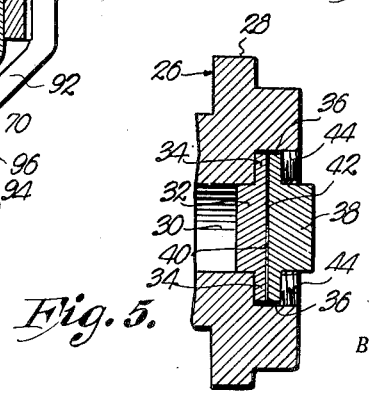
Fig. 5.
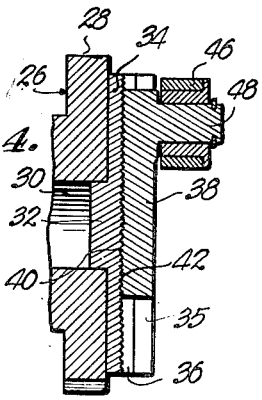
Fig. 4.
INVENTOR.
Charles H. Hill
BY
ATTORNEY.

United States Patent Office 2,694,962
Patented Nov. 23, 1954

2,694,962
SLOTTING HEAD FOR POWER TOOLS

Charles H. Hill, Hutchinson, Kans.

Application April 16, 1951, Serial No. 221,263

5 Claims. (Cl. 90—40)

This invention has to do with a machine tool attachment and more particularly to a slotting and key setting head that may be mounted upon a lathe or other machines, the primary objects including structure to permit adjusting the stroke thereof, means for relieving the cutting means of operation in one direction, and mechanism to guard against objectionable gouging or biting that may tend to cause damage to the attachment or to the work being slotted.

It is the most important object of the present invention to provide a tool as above set forth that includes a cutting element mounted on parts that are both reciprocable and swingable, all to the end that a slot of predetermined length, width and depth may be formed in any type of work with ease and speed.

Another important object of the present invention is to provide a slotting or milling tool that includes means having a rotatable crank for determining the length of stroke of the reciprocable cutter by means of a crank slide and lock arrangement for varying the point of interconnection between the reciprocable parts of the tool and the crank with respect to the axis of rotation of the latter.

Another very important object of this invention is the provision of a tool wherein the aforesaid swinging movement of the cutter for rendering the same operable in only one direction, is effected through the same crank that reciprocates the cutter by means of a cam surface on the crank and a swingable dog or cam follower that is in engagement with such cam surface.

Other objects include the way in which a ram is provided for mounting the cutter that is reciprocably mounted in a tubular ram housing; the way in which the ram housing itself is swingably mounted on a supporting body; the manner of disposing the cam follower in mutual interengagement with the cam surface of the rotating crank and with the swingable ram housing; the way in which linkage is provided between the rotating crank and the ram to reciprocate the latter upon rotation of the crank; the manner of providing quick and easy adjustment of the crank slide to move a connecting rod forming a part of the linkage toward and away from the axis of rotation of the crank; and many more minor objects all of which will be made clear or become apparent as the following specification progresses, reference being had to the accompanying drawing, wherein:

Figure 1 is a side elevational view of a sliding head for power tools made pursuant to the present invention, parts being broken away and in section to reveal details of construction.

Fig. 2 is a vertical, cross-sectional view taken on line II—II of Fig. 1 looking in the direction of the arrows.

Fig. 3 is an enlarged, fragmentary, detailed, cross-sectional view taken on line III—III of Fig. 1.

Fig. 4 is an enlarged, fragmentary, detailed, cross-sectional view taken on line IV—IV of Fig. 1; and Fig. 5 is an enlarged, fragmentary, detailed, cross-sectional view taken on line V—V of Fig. 1.

A hollow body, broadly designated by the numeral 10, is open at its bottom and formed substantially in the shape of a triangle with a lateral extension 12 on one end thereof. An access opening 14 is formed in one face of the body 10 and normally covered by a swingable plate 16. Mounting means for the body 10 is provided on the opposite face thereof and includes a neck 18 provided with an annular, outturned flange 20 that is perforated as illustrated in Fig. 2 to receive suitable fastening elements.

Suitable bearings 22 are provided in the neck portion 18 of body 10 for receiving tubular stem 23 having an operating shaft 24 removably connected with crank 26 through the medium of keys 27. Stem 23 is integral with crank 26. Substantially half of the crank 26 is of slightly greater radius than the remainder thereof to present a semi-circular cam surface 28 at its periphery and concentric with the axis of rotation of shaft 24. That face of the crank 26 opposite to the shaft 24 is provided with an opening 30 that receives a locking member including a plug 32 having opposed wings 34 disposed within an elongated slot 35 extending diametrically of the crank 26. Slot 35 is provided with an under-cut portion 36 adapted to receive a shiftable section or slide 38 that is T-shaped in cross-section, as shown in Fig. 5, and held in place on the crank 26 by extension into the under-cut portions 36 of crank 26.

Intermeshing serrations 40 and 42 are provided on the proximal faces of the lock 32 and the slide 38, and the latter is held against sliding movement along the diameter of crank 26 by setscrews 44 carried by the crank 26. A connecting rod 46 is pivotally joined with the slide 38 adjacent one end of the latter by a pivot pin 48 and rod 46 is connected with an arm 50 intermediate the ends of the latter for pivotal movement as at 52.

It is to be preferred that the arm 50 be provided with a semi-circular opening 54 extending into that edge thereof proximal to crank 26 for slidably receiving the connecting rod 46. Both rod 46 and the arm 50 are disposed within the body 10 and arm 50 has a slot 56 at the uppermost end thereof for slidably receiving a polygonal bushing 58 that spans the distance between the side walls of body 10 adjacent the upper end of the latter and is pivotally mounted on a cross pin 60.

An elongated, tubular ram housing 62 is mounted in the body 10 adjacent the lowermost open end of the latter and is swingably supported by the body 10 through the medium of a cross pin 64. The housing 62 is polygonal in external cross-section to present a flat uppermost face 66, which face is slotted as at 68 for clearing the arm 50. An elongated, reciprocable ram 70 disposed within the tubular housing 62, is polygonal in cross-section as shown in Fig. 3 to conform to the internal configuration of housing 62 and ram 70 is joined directly with the lowermost end of the arm 50 by means of an upstanding rib 72 intermediate the ends thereof. The arm 50 is bifurcated at the lowermost end thereof for receiving the ribs 72 and a cross-pin 74 serves as a means for pivotally joining arm 50 and the ram 70.

A bore 76 is provided in one end of the ram 70 for receiving a rod-like holder 78 for a cutting element 80. The holder 78 is removably held in place within the frusto-conical bore 76 by a cap member 82 adapted when threaded in place on the ram 70, to force the holder 78 tightly into the bore 76.

The crank 26 and the housing 62 are operably interconnected through the medium of a cam follower or dog 84 swingably mounted in the body 10 by a cross-pin 86 and having a roller 88 on one end thereof in engagement with the peripheral surface of the crank 26. It is noted that the dog 84 is substantially triangular-shaped, pivot pin 86 being at one corner, roller 88 at a second corner and the third corner 90 thereof bearing against the flat, upper surface 66 of housing 62. A triangular-shaped bracket 92 depends from the body 10 and receives a gauge that includes a screw 94 provided with a head or disc 96 on one end thereof that abuts against work 98 to be grooved or slotted by cutter 80. The screw 94 is locked in an adjusted position within the bracket 92 by nuts 100. A graduated rule 102 is provided on the lateral extension 12 of body 10 adjacent that end of the ram 70 opposite to holder 78 for providing a visual indication of the stroke of ram 70.

Housing 62 is yieldably held biased against the follower 84 by a spring 104 disposed within an L-shaped opening 106 of housing 62. A removable pin 108 carried by one side of the body 10 extends into the opening 106 and receives a stop 110 that extends into the spring 104. One end of the spring 104 bears against a disc head on one end of stop 110 and the opposite end thereof bears against a setscrew 112 that is received by the opening 106 at that end thereof proximal to flat face 66.

It is contemplated that the slotting attachment hereof be mounted upon an attachment (not shown) through the medium of the flange 20, which attachment in turn is removably secured to a lathe or the like. Such attachment is provided with a prime mover for the shaft 24, together with means for imparting vertical reciprocation to the entire head forming the subject matter of the present invention. Such vertical movement may be effected through employment of a conventional feed screw that is manually advanced by the operator as a groove is automatically formed in the work 98 by cutter 80. The operation of the sliding head hereof is, therefore, as follows:

Rotation of shaft 24 imparts like movement to the crank 26 and because of the eccentric disposition of pin 48 relative to shaft 24, the connecting rod 46 will operate to impart swinging movement to arm 50 on pin 60. Such continued swinging movement of arm 50 reciprocates the ram 70 within the housing 62, as well as the holder 78 and its cutter 80. Simultaneously, swinging movement is imparted to the housing 62, to the ram 70 reciprocating therein, the holder 78 and the cutter 80 by the cooperation of follower 84 and the spring 104. Downward swinging movement of the housing 62 is caused by the cam surface 28 coming into engagement with the roller 88, thereby swinging follower 84 on pin 86 to move corner 90 downwardly against the face 66 of housing 62. As soon as the crank 26 rotates to a position where the cam surface 28 is out of engagement with roller 88, spring 104 effects upward movement of the housing 62 on its pivot 64.

All of the parts just described are properly arranged and synchronized so that housing 62, and accordingly cutter 80, is held down during reciprocable movement of ram 70 in one direction and cutter 80 is biased upwardly by spring 104 when the ram 70 travels within housing 62 in the opposite direction. While the extent of downward movement of the housing 62 is determined by the cam surface 28 and such swinging movement is against the action of spring 104, continued downward movement of the cutter 80 to a point where housing 62 moves out of engagement with point 90 of follower 84 is limited by the interengagement of setscrew 112 with the stop element 110. Obviously the distance between the setscrew 112 and the stop 110, must be sufficiently great to permit free operation of the cam follower 84 as determined by the surface 28, but extended downward cutting or gouging of the cutter 80 into the work 98 is limited by the stops 110 and 112 moving together. The position of the work 98 relative to the slotting head hereof is adjusted by means of screw 94 and lock nuts 100, and the length of the stroke or extent of reciprocation of the ram 70, is determined by the position of slide 38 relative to crank 26. Shifting of slide 38 relative to crank 26 may be accomplished by loosening of setscrews 44. The position of pivot point 48 relative to the axis of rotation of crank 26 may thus be varied and the setscrews 44 again tightened to clamp the slide 38 tightly against lock 32 thereby preventing further sliding movement of section 38 within the guides 26.

Accessibility to the setscrews 44 to effect adjustment is made through opening 14 by swinging gate 16 from its normal position closing the access opening 14. As the cutter continues to reciprocate and to move downwardly against work 98 in one direction and upwardly under influence of spring 104 in the opposite direction, the operator, through manipulation of the aforesaid feed screw, progressively moves the entire head downwardly until a slot of predesired depth is formed in work 98.

It is noted that no rigid connection is provided for between the disc 96 and work 98, thereby permitting such downward feeding of the slotting head while work 98 is held rigidly.

It is now seen that the crank 26 serves the dual purpose of imparting reciprocable movement to the cutter 80 and forcing the same downwardly in one direction against the work 98. Downward movement is limited by stops 110 and 112 and adjustment of the stroke to determine the length of the slot to be cut in work 98 is made possible by the provision of crank slide 38 for connecting rod 46.

Details of construction may, obviously, vary from those above set forth, and such changes and modifications that farily come within the spirit of the invention are manifestly contemplated hereby.

Having thus described the invention what is claimed as new and desired to be secured by Letters Patent is:

1. In a tool of the kind described, a supporting body; a ram housing swingably carried by the body; a ram reciprocably mounted in said housing for swinging movement therewith; a cutter mounted on the ram for swinging movement and reciprocation therewith; a rotatable crank on the body provided with a cam surface at its periphery; a connecting rod operably connected with said ram and pivotally joined to the crank eccentrically of its axis of rotation for reciprocating the ram and the cutter as the crank rotates; means yieldably holding the housing biased toward one end of its path of travel; and a swingable dog interengaging said surface and the housing for swinging the housing, the ram and the cutter in one direction against the action of said yieldable means as the crank rotates to move the cutter toward and away from work to be cut as the ram and the cutter are reciprocated.

2. In a tool as set forth in claim 1 wherein is provided a stop member on the housing movable toward and away from the body to limit the extent of swinging movement of the housing in said one direction.

3. In a tool of the kind described, a supporting body; a ram housing swingably carried by the body; a ram reciprocably mounted in said housing for swinging movement therewith; a cutter mounted on the ram for swinging movement and reciprocation therewith; a rotatable crank on the body and provided with a cam surface at its periphery; a connecting rod operably connected with said ram and pivotally joined to the crank eccentrically of its axis of rotation for reciprocating the ram and the cutter as the crank rotates, said crank having means for varying the point of pivotal connection of said rod with the crank relative to the axis of rotation of the latter; and a swingable dog interengaging said surface and the housing for swinging the housing, ram and cutter in one direction against the action of said yieldable means as the ram and the cutter are reciprocated.

4. In a tool of the kind described, a supporting body; a ram housing swingably carried by the body; a ram reciprocably mounted in said housing for swinging movement therewith; a cutter mounted on the ram for swinging movement and reciprocation therewith; a rotatable member on the body; means operably interconnecting the member and said ram for reciprocating the ram and the cutter as the member rotates; and structure having parts operably interconnecting the member and the housing for swinging the housing, the arm and the cutter as the member rotates to move the cutter toward and away from work to be cut as the ram and the cutter are reciprocated, said structure including yieldable means interposed between the housing and the body, and said parts including a cam surface on the member and movable element in engagement with said surface and with said housing for swinging the housing in one direction against the action of said yieldable means, there being relatively movable stops on the housing and the body respectively for limiting the extent of swinging movement of the housing in said one direction.

5. In a tool of the kind described, a supporting body; a ram housing swingably carried by the body; a ram reciprocably mounted in said housing for swinging movement therewith; a cutter mounted on the ram for swinging movement and reciprocation therewith; a rotatable member on the body; means operably interconnecting the member and said ram for reciprocating the ram and the cutter as the member rotates; and structure having parts operably interconnecting the member and the housing for swinging the housing, the arm and the cutter as the member rotates to move the cutter toward and away from work to be cut as the ram and the cutter are reciprocated, said means including a connecting rod pivotally joined with said member and said member being provided with means for varying the point of pivotal connection of said rod with the member relative to the axis of rotation of the latter.

References Cited in the file of this patent

UNITED STATES PATENTS

| Number | Name | Date |
|---|---|---|
| 1,282,394 | Driver | Oct. 22, 1918 |
| 1,513,883 | Bausch | Nov. 4, 1924 |
| 1,537,059 | Bausch | May 12, 1925 |

FOREIGN PATENTS

| Number | Country | Date |
|---|---|---|
| 542,111 | Great Britain | Nov. 7, 1941 |
| 567,746 | Great Britain | Mar. 1, 1941 |